Patented Sept. 20, 1927.

1,643,031

UNITED STATES PATENT OFFICE.

ROBERT N. RIDDLE, OF PHILADELPHIA, PENNSYLVANIA, ASSIGNOR TO RIDDLE PROCESS COMPANY INC., A CORPORATION OF NEW YORK.

FILTERING MEDIUM AND PROCESS OF MAKING SAME.

No Drawing. Application filed March 28, 1922, Serial No. 547,552. Renewed February 12, 1927.

My present invention relates to the production of a highly efficient decolorizing agent for decolorizing sugar and other materials It comprises a process for producing a form of carbon of the most porous character highly efficient for this purpose, and the product of that process.

As an example of the best method of carrying out my invention at present known to me, I proceed as follows:

I take 200 grams of a good gas coal (such as Westmoreland coal having 59 per cent of fixed carbon and ash, and 41 per cent of volatile matter) and grind to a fineness of 200 mesh. I then take 80 grams of soda ash (dry carbonate of soda) and dissolve it in 200 cubic centimeters of boiling water and add 10 grams of the best oxide lime, which has been expertly slacked to obtain maximum bulk and smoothness or grain. The mixture of soda ash and lime is boiled for about five (5) minutes, and is added, boiling, to the powdered coal, and the whole mass boiled with energetic stirring until it becomes pasty. It is then allowed to cool to about 50 degrees centigrade or below. The object of this treatment is the production of an intimate mixture of the alkalies, the expulsion of any air in the coal, etc. During it a marked concentration of volume of the entire mass occurs. Sufficient water is then added to bring the total water content back to about 200 cubic centimeters, and the mass is stirred slowly while 35 grams of bicarbonate of soda dissolved in, or mixed with, 40 cubic centimeters of water, is poured into it. The entire mass so formed is now boiled and stirred until the water content is reduced to about 200 cubic centimeters.

The mixture last formed is cooled with constant stirring down to a temperature below 34 degrees centigrade. During this last step there is a great increase in volume and considerable heat liberated as a result of the crystallization of the soda which occurs. The total volume of the mass after the above treatment approximates 1000 cubic centimeters, or one litre.

The cooled product is then passed through ordinary mosquito netting or other form of sieve of about the same mesh, and the coarse grains not passing through the netting, eliminated. They are black in color while still wet. The sieved mass is then air-dried at a temperature below 34 degrees centigrade, which is the melting point of the hydrated sodium carbonate produced by the above described treatment with the boiling water. This drying can be accomplished in about three hours, or a less period of time. The material then becomes light gray in color, smooth as talcum powder, and reduced in volume to about 750 cubic centimeters.

The reason why the temperature of the drying operation is maintained below 34 degrees C. is to prevent the sodium carbonate from fusing. This preserves the crystalline form of the material in outline, after the water of crystallization has been expelled.

The dried mass has a weight somewhat less than the combined weights of the original constituents (excluding water and assuming the coal to have contained 2 or 3 per cent of moisture). The combined weight of the original materials amounted to 325 grams, but I find, that the resultant weight of the mixture is less by about 15 grams. The difference is probably due to the loss of carbon dioxide from the sodium bicarbonate during the heating of the final solution.

The coal should be used as soon as possible after grinding, as it tends to oxidize in the air, and is subject to spontaneous combustion, and if its temperature rises to 150 degrees centigrade it will undergo profound chemical changes and burn without smoke to a graphitic condition of fixed carbon. To avoid this oxidization completely the coal may be ground and maintained in a reducing or non-oxidizing atmosphere. The mixing of the coal, lime and sodium carbonate should also be carried on in a non-oxidizing atmosphere.

The dried mixture above described is next slowly heated in a current of illuminating gas. The quantity of illuminating gas used in this step of the process should be just sufficient to produce as a product a combustible mixture of gases and the maintenance of this condition can be indicated by burning a small jet of the products given off. No considerable loss of volatile matter from the coal is indicated at this point. If a smoky appearance occurs in the escaping gas, or in the flame produced by burning it, the heat applied should be greatly reduced, or the treatment discontinued entirely for a time, and resumed later, and this procedure repeated until, in a few hours, it is possible to heat the mass to a bright red with the evolution of only fine, or colorless, gaseous fumes. The limits of temperature in this last step of the process vary usually from 300 to 350 degrees centigrade, though at the end it may be raised to red heat. I have found that about 80 per cent of the original volatile matter in the coal remains after this preparation process. In this step part or all of the distilled gases and vapors may be recovered, instead of being burned as above described. I obtain from such distillate a small quantity of a red oil, presumably containing phenols and cresols, but free from tar and the products of the ordinary destructive distillation of coal.

The solid residue weighs from about 265 to about 292 grams.

The product of the above described preparatory step of my process is a fine pulverulent mass, not sintered or caked, but in finely divided condition, not adhesive to the walls of the container even when highly heated. This product is next put in an iron tube or other sufficiently refractory container and subjected to ordinary coking temperature of from 600 to 1000 degrees centigrade in the presence of a stream of nitrogen. The escaping gases will burn in the atmosphere and when they cease to so burn that indicates that this step of the process is completed and the supply of nitrogen should be shut off. If carried on at a temperature of 600 degrees this step of the process will usually be concluded in about six hours, while if the temperature is maintained at 1000 degrees, only about three hours is required.

The burning of the gases in this step may be omitted when the operator has become sufficiently experienced to time the operation without guidance from the expiring jet of burning gases, and if the products of distillation are recovered there will be obtained during the first period of this fixation step (while the temperature is rising from 600 to 700 degrees centigrade) a liquid compound having a sweet odor.

After the escaping products of the coking step cease to burn, the residue is cooled in situ to a temperature of about 200 degrees centigrade, steam is passed through the mass and the vapors so produced may be condensed or absorbed. They will be found to consist essentially of ammonia. By redistilling the entire product a pure ammonia may be isolated.

After the formation of these products by the treatment with steam ceases, the residual material may again be heated as before in the presence of nitrogen with renewed production of combustible gas, and, after this ceases, cooled and the treatment with steam repeated, giving off a second supply of ammonia and similar products as before and of a volume nearly equal to that first realized. Thereafter this step of the operation may be again repeated several times, but with decreasing yields of ammonia, etc., until the quantity developed becomes so small that further repetitions become unprofitable.

The sodium carbonate can be recovered from the residue of the final steam treatment less a small proportion which may have combined with the ash of the coal and such recovered carbonate can be used again in repetition of the process.

While, as I am advised, it is not necessary for the purposes of this specification that an absolutely correct theory of the various chemical or other reactions occuring in the above described process should be set forth, I may say that my present belief is that the large yield of the thoroughly nitrogenized product obtained is principally due to the following facts: First, the saturated solution of sodium carbonate obtained by the treatment of the original soda-carbon mass with boiling water crystallizes promptly on cooling and in such crystallization, (as well as the expansion of the hydrate of lime when forming carbonate of lime in this step of the process), of course, creates powerful expansive forces which break up into still more minute particles the already finely pulverized coal, by which the sodium carbonate and lime solutions have been partly or wholly absorbed or with which it is intimately mixed. Second, by drying the sodium carbonate crystals at a temperature below the fusing point thereof the ten molecules of water of hydration in each crystal is driven off without destroying the general outline of the crystals or further compacting the walls thereof, thus leaving them of a highly porous structure, somewhat like coral, most permeable to any gases to the action of which the mass may be subsequently subjected. This skeleton structure of porous crystals is impregnated with, and embedded in, the mass of infinitely small, thoroughly disrupted particles of the soft coal complex. Third, in the preparatory heating step of the process the reducing gas apparently modifies greatly the ordinary decomposition of the coal and allows only of the production of a colorless, odorless combustible gas, representing about 20 per cent of the original hydrocarbon content of the coal. This gas, I have demonstrated, is not water gas. Fourth, when the carbon of the coal, left by the described preliminary treatment in a minutely divided condition evenly distributed throughout the pores of the dehydrated sodium carbonate crystals and between said crystals, is subjected to the action of nitrogen at coking temperatures it has every opportunity for intimate and complete contact with said nitrogen, and, being of the well-known active character of finely pulverized coal, is further activated by its previous treatment, it quickly and completely combines with the nitrogen to form the desired product. Fifth, the presence of the reducing atmosphere in the preparatory heating step of the process also prevents any deleterious action then or subsequently on the carbon content of the mixture by any oxygen present in the raw coal. Such oxygen always exerts a deleterious influence in ordinary coking processes, but, according to the present invention, it is removed in the above described preparation step of my process.

I have proved by repeated experiments, that the herein described results cannot be achieved to the same degree if ordinary, hard forms of sodium carbonate are used, even if they are reduced to the utmost degree of fineness by grinding, or by a flotation process, or by boiling them in air or in a vacuum. I believe that the novel results of the herein described process are mainly due to the soft porous condition to which the sodium carbonate is reduced after mixture with the coal by the treatment described, which condition probably resembles that to which the ordinary sal-soda, sold for domestic use, is reduced by efflorescence.

The carbonate of soda can be recovered from the residue remaining after the last step of the process, and used over again. The highly activated carbon residue forms an excellent material for clarifying and decoloring sugar, oils, etc.

It should be understood that the proportions of materials used and the time limits of various steps above given may be varied without entirely departing from the principle of my invention, or losing the advantages derived from my discovery. The proportions and other specific details above given are merely those which I have so far found to give the best results.

Also other alkaline-metal carbonates may be substituted for sodium carbonate, and certain of the minor ingredients and steps of treatment may be omitted without entirely impairing the results of the process, as described.

Having described my invention, I claim

1. The process of forming a filtering body which comprises the following steps: first, saturating a mass of finely divided soft coal with a solution of an alkali-metal carbonate and allowing the said solution to crystallize; second, air drying said mass at a temperature below the point of fusion of said carbonate; third, heating the dried mass in a reducing atmosphere at and below the temperature of red heat; fourth, further heating the mass to a coking temperature in the presence of a material which will combine with the volatile constituents of the coal; fifth, treating the mass so produced with a material which will remove the compounds formed in the coking steps, leaving as a residue a mixture of pure carbon with the alkali-metal carbonate, and. sixth, separating out the carbonate, leaving the body of finely divided, porous carbon.

2. The process of forming a filtering material which comprises the following steps: first saturating a mass of finely divided soft coal with a boiling aqueous solution of an alkali-metal carbonate and lime; second, cooling the mass and air drying the same at a temperature below the fusion point of the carbonate; third, heating the dried mass in a current of illuminating gas sufficient in quantity to combine with the products of distillation and form a combustible mixture, the said heating being carried on at progressively increasing temperatures up to bright red, but always below those which will cause a smoky appearance in the escaping gases or in any flame produced by the combustion thereof at any period of such heating; fourth, heating the mass in the presence of nitrogen to a temperature between 600 and 1000 degrees centigrade; fifth, cooling the mass to a temperature of about 200 degrees centigrade and passing steam over the same to remove the compounds formed by the nitrogen with the volatile constituents of the coal, and washing out the sodium carbonate.

3. The herein described process of making a carbonaceous filtering material which comprises the following steps: first, forming a solution of sodium carbonate and a minor proportion of hydrated lime with hot water and saturating a body of finely divided soft coal with said hot solution; second, boiling said solution and stirring the mass and subsequently cooling to a temperature of about 50 degrees centigrade; third, adding a small quantity of sodium bicarbonate in an aqueous solution and slowly cooling the mixture; fourth, air drying it at a temperature below 34 degrees centigrade; fifth, heating the dried mixture in a current of illuminating gas at temperatures progressively increasing from 300 degrees centigrade, but temporarily interrupting said heating whenever the mixture of gas and distillation products given off becomes smoky or burns with a smoky flame, and terminating said heating when it becomes possible to attain a bright red heat with the evolution of only colorless gaseous fumes; fifth, coking the carbonaceous constituent of the fine, non-caking powder so formed in a stream of nitrogen as long as the escaping mixture of gases and vapors remain combustible; sixth, cooling the residue to a temperature of about 200 degrees centigrade, and passing steam through it; seventh, separating the alkaline constituents from the coke formed in the fifth step.

4. The process of forming a carbonaceous filtering material which comprises the following steps: first, forming a boiling solution of sodium carbonate in the proportion of 200 cubic centimeters of water to every 80 grams of the sodium carbonate and adding about one-eighth of the weight of the sodium carbonate, of lime which has first been hydrated; second, boiling the mixture so formed and adding it hot to a body of finely divided soft coal of about two and a half times the weight of the original carbonate, and stirring the mixture until it becomes paste-like in consistency; third, adding sufficient water to re-establish the original water content; fourth, stirring the mass and adding sodium carbonate equal to about half the weight of the original sodium carbonate, said quantity of bicarbonate having been mixed with a quantity of water equalling about twenty per cent of the amount of water originally mixed with the sodium carbonate; and boiling and stirring such mixture until the total water content is reduced to the volume originally mixed with the sodium carbonate; fifth, cooling the partially reduced mixture to about 34 degrees centigrade, sifting it and air drying it at a temperature not exceeding the fusion point of sodium carbonate; sixth, heating the dried mixture in a current of illuminating gas at temperatures progressively increasing from 300 degrees centigrade, but temporarily interrrupting said heating whenever the mixture of gas and distillation products given off becomes smoky or burns with a smoky flame, and terminating said heating when it becomes possible to attain a bright red heat with the evolution of only colorless gaseous fumes; seventh, further heating the mass in a stream of nitrogen to a temperature between 600 and 1000 degrees centigrade so long as the escaping gases are combustible; eighth, cooling the mass to about 200 degrees centigrade and treating it with steam; ninth, washing out the soluble constituents from the residue.

ROBERT N. RIDDLE.